(12) United States Patent
Shida et al.

(10) Patent No.: US 7,332,025 B2
(45) Date of Patent: Feb. 19, 2008

(54) RESIN COMPOSITION AND PROCESS FOR PREPARING MULTI-LAYER STRUCTURE USING THE SAME

(75) Inventors: Mitsuzo Shida, Long Grove, IL (US); Mark S. Pucci, Elk Grove Village, IL (US); Kuniyasu Kato, Arlington Heights, IL (US); Hideshi Onishi, Kurashiki (JP)

(73) Assignees: The Nippon Synthetic Chemical Industry Co., Ltd., Osaka (JP); SOARUS, L.L.C., Arlington Heights, IL (US)

( * ) Notice: Subject to any disclaimer, the term of this patent is extended or adjusted under 35 U.S.C. 154(b) by 271 days.

(21) Appl. No.: 10/925,787

(22) Filed: Aug. 24, 2004

(65) Prior Publication Data

US 2006/0047040 A1    Mar. 2, 2006

(51) Int. Cl.
*C08J 11/00* (2006.01)
*C08J 11/16* (2006.01)
*C08J 11/26* (2006.01)
*C08J 3/20* (2006.01)

(52) U.S. Cl. .................. 106/626; 524/338; 524/503; 524/524; 524/528; 525/222; 525/240; 428/903.3

(58) Field of Classification Search ............ 524/338, 524/442, 563, 570, 582, 583, 584, 585, 586, 524/503, 524, 528; 525/222, 240; 428/903.3; 106/626
See application file for complete search history.

(56) References Cited

U.S. PATENT DOCUMENTS 5,063,264 A * 11/1991 Nakajima .................. 524/118
6,667,358 B1 * 12/2003 Aoyama ..................... 524/436

FOREIGN PATENT DOCUMENTS

| JP | 60-199040 | | 10/1985 |
|---|---|---|---|
| JP | 62-011748 | | 1/1987 |
| JP | 01-178543 | | 7/1989 |
| JP | 02255847 A | * | 10/1990 |
| JP | 04136051 A | * | 5/1992 |
| JP | 07033906 A | * | 2/1995 |
| JP | 08-104370 | | 4/1996 |
| WO | WO 0069961 A1 | * | 11/2000 |

OTHER PUBLICATIONS

Patent Abstracts of Japan, Publication No. 60-199040, Published Oct. 8, 1985, "Resin Composition", Tohei et al.
Patent Abstracts of Japan, Publication No. 62-011748, Published Jan. 20, 1987, "Resin Composition", Shiegezo et al.
Patent Abstracts of Japan, Publication No. 01-178543, Published Jul. 14, 1989, "Halogenated Theramoplastic Resin Composition", Yoshimi et al.
Patent Abstracts of Japan, Publication No. 08-104370, Published Apr. 23, 1996, "Cooked Food Packaging Container", Tanahashi et al.

* cited by examiner

*Primary Examiner*—Kelechi C. Egwim
(74) *Attorney, Agent, or Firm*—Ware, Fressola, Van De Sluys & Adolphson

(57) ABSTRACT

The present invention provides a resin composition that is added when a multi-layer structure containing hydrolyzed ethylene-vinyl acetate copolymer is reground into a multi-layer structure and a process for preparing a multi-layer structure using the resin composition. Specifically, the present invention relates to a resin composition comprising (A) polyolefin, (B) metal salt of higher fatty acid having 12 to 30 carbon atoms and (C) zeolite. Also, the multi-layer structure is prepared by the process of regrinding by adding the resin composition to a multi-layer structure containing hydrolyzed ethylene-vinyl acetate copolymer.

4 Claims, No Drawings

RESIN COMPOSITION AND PROCESS FOR PREPARING MULTI-LAYER STRUCTURE USING THE SAME

BACKGROUND OF THE INVENTION

The present invention relates to a resin composition that can solve the various problems that occur when a multi-layer structure containing hydrolyzed ethylene-vinyl acetate copolymer is reground into a multi-layer structure, by adding the resin composition when processing. Also, the present invention relates to a process for preparing a multi-layer structure using the resin composition.

A multi-layer structure comprising, for example, polyolefin, modified polyolefin (adhesive resin) and hydrolyzed ethylene-vinyl acetate copolymer (hereinafter may be referred to as EVOH) can be reground into a multi-layer structure. However, there is the problem that degraded materials derived from EVOH develop when regrinding, by influence of the catalyst contained in polyolefin. Also, in the case that an organic or an inorganic colorant is contained in the collected multi-layer structure, there is the problem that cross-linking of EVOH occurs, due to agglomeration of the colorant.

In order to solve such problems, conventionally, a special additive that is added when regrinding has been considered and for example, JP-A-60-199040, JP-A-62-11748 and JP-A-1-178543 suggest an additive using hydrotalsite or a hydrotalsite solid solution. However, both of these additives are effective for inhibiting production of degraded materials derived from EVOH, but do not sufficiently improve the other problems. For example, when a multi-layer structure that does not contain a colorant is reground, there is the problem that transparency cannot sufficiently be maintained. In contrast, when a multi-layer structure containing a colorant is reground, further prevention of agglomeration of the colorant is required.

Also, when regrinding is conducted in this way, containers, for example, are prepared using the multi-layer structure obtained by regrinding. In such a case, EVOH in the multi-layer structure is exposed to excessive heat and there is the problem that odorous decomposition gas that is generated by thermal decomposition of EVOH tends to transfer to the inside and outside of the container. Improvement regarding this point is also desired. With respect to preventing transferring of odor, JP-A-8-104370 suggests a packaging container for cooked food in which zeolite is dispersed. However, JP-A-8-104370 describes a container in which zeolite is dispersed in a specific layer of the multi-layer structure forming the container, in order to prevent transferring of odor from the container to the food inside the container. The method of adding zeolite in any layer of the multi-layer structure, with consideration to collecting and regrinding the multi-layer structure, has not yet been suggested.

SUMMARY OF THE INVENTION

The present invention relates to a resin composition comprising (A) polyolefin, (B) metal salt of higher fatty acid having 12 to 30 carbon atoms and (C) zeolite.

The resin composition preferably contains (D) hydrolyzed ethylene-vinyl acetate copolymer wherein the ethylene content is 70 to 95% by mol and the hydrolysis degree of the vinyl acetate component is at least 85% by mol.

The content of (C) zeolite is preferably at least 5% by weight and less than 50% by weight.

The weight ratio of (A) polyolefin and (D) hydrolyzed ethylene-vinyl acetate copolymer is preferably 95 to 30:5 to 70.

The present invention also relates to a process for preparing a multi-layer structure, which comprises the step of regrinding by adding the resin composition to a multi-layer structure containing hydrolyzed ethylene-vinyl acetate copolymer.

The hydrolyzed ethylene-vinyl acetate copolymer preferably has ethylene content of 20 to 65% by mol and the hydrolysis degree of the vinyl acetate component is preferably at least 90% by mol.

DETAILED DESCRIPTION

The resin composition of the present invention is a resin composition comprising polyolefin (A), metal salt of higher fatty acid having 12 to 30 carbon atoms (B) and zeolite (C).

Examples of polyolefin (A) are high-density polyethylene (HDPE), middle-density polyethylene (MDPE), low-density polyethylene (LDPE), very low-density polyethylene (VLDPE), linear low-density polyethylene (LLDPE), ethylene-vinyl acetate copolymer (EVA) and polypropylene (PP). From the viewpoint of thermal stability of the resin itself, PE is particularly preferable. The amount of polyolefin (A) in the resin composition of the present invention is preferably 45 to 95% by weight, more preferably 70 to 90% by weight. When the amount is less than 45% by weight, the resin composition tends to not be able to hold its shape as an additive. When the amount is more than 95% by weight, the improvement effect, which is an object of the present invention, tends to be insufficient.

The metal salt of higher fatty acid having 12 to 30 carbon atoms (B) is compounded as a lubricant. The metal salt of higher fatty acid having 12 to 30 carbon atoms (B) can be a metal salt of a fatty acid, such as lauric acid, myristic acid, palmitic acid, stearic acid, arachic acid, heptadecyl acid, behenic acid, oleic acid, elaidic acid, erucic acid, linoleic acid, linolenic acid, ricinolic acid, hydroxystearic acid, montanic acid, isostearic acid and epoxystearic acid, and alkali metal, alkali earth metal or heavy metal. When the number of carbon atoms of the fatty acid is less than 12, odor transfer preventing properties tend to be insufficient. When the number of carbon atoms is more than 30, the effect of inhibiting cross-linking tends to be insufficient. Of these metal salts, stearate and hydroxystearate of calcium, magnesium or zinc are preferably used from the viewpoint of multi-purpose use and processability. The amount of the metal salt of higher fatty acid having 12 to 30 carbon atoms (B) in the resin composition of the present invention is preferably 0.5 to 15% by weight, more preferably 1 to 10% by weight. When the amount is less than 0.5% by weight, the effect of inhibiting cross-linking tends to be insufficient. When the amount is more than 15% by weight, processability tends to be influenced as supply properties to an extruder become unstable.

Zeolite (C) is usually composed of $SiO_2$, $Al_2O_3$, $Fe_2O_3$, MgO, CaO, $P_2O_5$, $Na_2O$ and $K_2O$. In the present invention, both natural zeolite and synthetic zeolite can be used. The amount of zeolite (C) in the resin composition of the present invention is preferably at least 5% by weight and less than 50% by weight, more preferably at least 7% by weight and less than 20% by weight. When the amount is less than 5% by weight, the effect of inhibiting cross-linking and odor transfer preventing properties tend to be insufficient. When the amount is 50% by weight or more, the resin composition tends to not be able to hold its shape as an additive.

The resin composition of the present invention more preferably contains hydrolyzed ethylene-vinyl acetate copolymer (D) from the viewpoint of improving the effect of inhibiting cross-linking. The ethylene content of hydrolyzed ethylene-vinyl acetate copolymer (D) is preferably 70 to 95% by mol, more preferably 75 to 92% by mol, further preferably 80 to 90% by mol. When the ethylene content is less than 70% by mol, the effect of inhibiting cross-linking and odor transfer preventing properties tend to be insufficient. When the ethylene content is more than 95% by mol, the effect of inhibiting cross-linking tends to be insufficient. Also, the hydrolysis degree of the vinyl acetate component of hydrolyzed ethylene-vinyl acetate copolymer (D) is preferably at least 85% by mol, more preferably at least 90% by mol, further preferably at least 95% by mol. When the hydrolysis degree of the vinyl acetate component is less than 85% by mol, the effect of inhibiting cross-linking and odor transfer preventing properties tend to be insufficient. Furthermore, the melt flow rate (MFR) of hydrolyzed ethylene-vinyl acetate copolymer (D) is preferably 0.5 to 200 g/10 minutes, more preferably 1 to 100 g/10 minutes, further preferably 3 to 50 g/10 minutes. When MFR is lower than 0.5 g/10 minutes, the effect of inhibiting cross-linking tends to be insufficient. When MFR is higher than 200 g/10 minutes, the appearance of the molded article prepared by adding the resin composition tends to become poor.

In the resin composition of the present invention, the weight ratio of polyolefin (A) and hydrolyzed ethylene-vinyl acetate copolymer (D) is 95 to 30:5 to 70, more preferably 90 to 50:10 to 50. When the amount of polyolefin (A) is too large, the effect of inhibiting cross-linking tends to be insufficient. When the amount of hydrolyzed ethylene-vinyl acetate copolymer (D) is too large, the appearance of the molded article prepared by adding the resin composition tends to become poor.

The resin composition of the present invention is added as an additive when preparing a multi-layer structure by collecting a multi-layer structure (multi-layer body) containing EVOH and then regrinding. When regrinding a multi-layer structure containing EVOH, problems occur, such as degraded materials derived from EVOH develop and odorous gas generated by decomposition and degradation of EVOH (such as acetaldehyde, crotonaldehyde and acetone) transfer to the outside of the multi-layer structure. However, these problems can be inhibited by adding the resin composition of the present invention when regrinding. Also, in the case that an organic or inorganic colorant is contained in the collected multi-layer structure, the colorant agglomerates when regrinding, causing cross-linking of EVOH. However, by adding the resin composition of the present invention, cross-linking can be inhibited.

The resin composition of the present invention can be added as the additive in any form. For example, polyolefin (A), metal salt of higher fatty acid having 12 to 30 carbon atoms (B) and zeolite (C) can be kneaded with an twin-screw extruder to form pellets and the obtained pellets can be used as the additive.

The multi-layer structure containing EVOH is not particularly limited, as long as the multi-layer structure can be reground, and can be multi-layer sheets comprising an EVOH layer and a thermoplastic resin layer or various products obtained from such sheets. When adding the resin composition of the present invention, the multi-layer structure can be in the form as collected, can be broken into pieces or can be remolded into pellets.

As the EVOH of the collected multi-layer structure, EVOH wherein the ethylene content is 20 to 65% by mol and the hydrolysis degree of the vinyl acetate component is at least 90% by mol can be used. EVOH that is generally available, wherein the ethylene content is 26 to 48% by mol and the hydrolysis degree of the vinyl acetate component is at least 90% by mol, can be used.

When adding the resin composition of the present invention to the collected multi-layer structure containing EVOH, thermoplastic resin and pigment can be added together, when necessary. The obtained mixture is reused for preparing a multi-layer structure together with thermoplastic resin and adhesive resin and forms at least one layer of the multi-layer structure. The amount of the resin composition of the present invention that is added to the collected multi-layer structure is not particularly limited, but is preferably 0.5 to 10 parts by weight, more preferably 1 to 5 parts by weight, based on 100 parts by weight of the chips or remolded pellets of the collected multi-layer structure. When the amount is less than 0.5 part by weight, the effect of inhibiting cross-linking and odor transfer preventing properties tend to be insufficient. When the amount is more than 10 parts by weight, the appearance of the molded article prepared by adding the resin composition tends to become poor.

The multi-layer structure prepared by adding the resin composition of the present invention can be reground into a multi-layer structure by adding the resin composition of the present invention. Consequently, by using the resin composition of the present invention, the reground multi-layer structure containing EVOH can be reused without decreasing the properties of the obtained multi-layer structure.

The multi-layer structure prepared by adding the resin composition of the present invention is useful as plastic cups and also as packaging material for foods, pharmaceutical products, agricultural chemical products and industrial chemical products.

EXAMPLE 1

A resin composition comprising LDPE (A) [available from Japan Polyethylene Co., Ltd., LF440HB, MFR: 2.8 g/10 minutes (190° C., load of 2160 g), density: 0.925 g/cm$^3$], calcium stearate S (B) [available from NOF Corporation], natural mordenite zeolite (C) [available from NITTO FUNKA KOGYO K.K., SP#2300] and hydrolyzed ethylene-vinyl acetate copolymer (D) [available from Tosoh Corporation, Melthene® H6051, ethylene content: 89% by mol, hydrolysis degree: 100% by mol, MFR: 5.5 g/10 minutes] in a weight ratio of (A)/(B)/(C)/(D)=70/5/10/15 ((A)/(D)=82/18) was kneaded using a 30 mm φtwin-screw extruder to prepare modifying pellets.

Separately, EVOH [ethylene content: 32% by mol, hydrolysis degree: 99.6% by mol, MFR: 3.5 g/10 minutes (210° C., load of 2160 g) containing 0.03% of boric acid converted to boron], thermoplastic resin (polypropylene) [BP AMOCO, AMOCO 3143, MFR: 2.8 g/10 minutes (230° C., load of 2160 g)] and adhesive resin (LLDPE modified with maleic anhydride) [Rohm & Haas Company, Tymor 1203] were supplied to a machine for forming co-extruded multi-layer sheets (made by GSI Creos Corporation) and a multi-layer sheet was extruded with a structure of (inside) thermoplastic resin layer/adhesive resin layer/EVOH layer/adhesive resin layer/thermoplastic resin layer (outside). 4 parts by weight of master batch of TiO$_2$ white pigment available from Standridge Color Corporation (WHITE PP 315 PART #444883) was added to polypropylene and processing was conducted. The thickness of each layer of the obtained multi-layer sheet was (inside) thermoplastic resin layer/adhesive resin layer/EVOH layer/adhesive resin layer/ thermoplastic resin layer (outside)=400/25/50/25/500 (μm).

Subsequently, the obtained sheet was crushed by a crushing machine (mesh of 30 mm φdiameter) to obtain chips of the multi-layer structure (apparent density: 0.42 g/cc). The EVOH content of the chips was 6.1% by weight.

To 100 parts by weight of the chips, 5 parts by weight of the modifying pellets were added. Then, 100 parts by weight of the above polypropylene and 2 parts by weight of the white pigment master batch were compounded and dry mixing was conducted in a tumbler to obtain a mixture. The content of EVOH in the mixture was 8.4% by weight. The obtained mixture was supplied into the inner and outer layer extruder of a machine for forming co-extruded multi-layer sheets and a multi-layer sheet (multi-layer body) having the structure of (inside) regrind (mixture) layer/adhesive resin layer/EVOH layer/adhesive resin layer/regrind (mixture) layer (outside)=400/25/50/25/500 (μm) was prepared in the same manner as the above multi-layer sheet.

After the process of crushing the obtained multi-layer sheet, adding 5 parts by weight of the modifying pellets, 100 parts by weight of polypropylene and 2 parts by weight of the white pigment master batch and preparing a multi-layer sheet was repeated 20 times in the same manner as above, long-run processability was evaluated in the following manner. The results are shown in Table 1.

The EVOH content of the mixture was 8.4% by weight in the first run and 9.8% by weight in the twentieth run. In each run from the first to the twentieth, the content of EVOH was within the range of 6.1 to 9.8% by weight.

(1) Surface Smoothness

The appearance of the multi-layer sheet obtained after repeating the process 20 times was visually observed and evaluated according to the following criteria.
o: No streaks and wavy patterns
Δ: Some streaks and wavy patterns
X: Noticeable streaks and wavy patterns (2) Fish-Eye After the process was repeated 20 times, the number of fish-eye having a diameter of 0.4 mm or more per 100 cm$^2$ of the regrind layer of the multi-layer sheet was measured and evaluation was conducted according to the following criteria.
o: Less than 2
Δ: 2 to 4
X: 5 or more (3) Pigment Dispersibility After the process was repeated 20 times, the number of pigment agglomerates of a visually observable size (average diameter of 0.1 mm or more) per 100 cm$^2$ of the regrind layer of the multi-layer sheet was measured and evaluation was conducted according to the following criteria.
o: Less than 2
Δ: 2 to 4
X: 5 or more (4) Inhibition of Foreign Material Produced by Phase-Separation (Buildup)

The frequency of buildup being mixed in the regrind layer in the 20 times that the molding process was conducted was observed and evaluation was conducted according to the following criteria.
o: Foreign material is mixed in less than 2 times
Δ: Foreign material is mixed in 2 to 10 times
X: Foreign material is mixed in more than 10 times

EXAMPLE 2

The experiment and evaluation were conducted in the same manner as in Example 1, except that hydrolyzed ethylene-vinyl acetate copolymer (D) was not added and the weight ratio was LDPE (A)/calcium stearate (B)/zeolite (C)=85/5/10. The results are shown in Table 1.

EXAMPLE 3

The experiment and evaluation were conducted in the same manner as in Example 1, except that polypropylene [available from Japan Polychem Corporation, FY6C, MFR: 2.4 g/10 minutes (230° C., load of 2160 g), density: 0.90 g/cm$^3$] was used instead of LDPE (A). The results are shown in Table 1.

EXAMPLE 4

The experiment and evaluation were conducted in the same manner as in Example 1, except that zinc stearate [available from Eishin Kasei, EZ-104] was used instead of calcium stearate (B). The results are shown in Table 1.

EXAMPLE 5

The experiment and evaluation were conducted in the same manner as in Example 1, except that the weight ratio was LDPE (A)/calcium stearate (B)/zeolite (C)/hydrolyzed ethylene-vinyl acetate copolymer (D)=40/5/40/15 ((A)/(D)=73/27). The results are shown in Table 1.

EXAMPLE 6

The experiment and evaluation were conducted in the same manner as in Example 1, except that the weight ratio was LDPE (A)/calcium stearate (B)/zeolite (C)/hydrolyzed ethylene-vinyl acetate copolymer (D)=30/6/5/59 ((A)/(D)=34/66). The results are shown in Table 1.

EXAMPLE 7

The experiment and evaluation were conducted in the same manner as in Example 1, except that the weight ratio was LDPE (A)/calcium stearate (B)/zeolite (C)/hydrolyzed ethylene-vinyl acetate copolymer (D)=78/5/2/15 ((A)/(D)=84/16). The results are shown in Table 1.

EXAMPLE 8

The experiment and evaluation were conducted in the same manner as in Example 1, except that the weight ratio was LDPE (A)/calcium stearate (B)/zeolite (C)/hydrolyzed ethylene-vinyl acetate copolymer (D) 25/5/55/15 ((A)/(D)=63/37). The results are shown in Table 1.

EXAMPLE 9

The experiment and evaluation were conducted in the same manner as in Example 1, except that the weight ratio was LDPE (A)/calcium stearate (B)/zeolite (C)/hydrolyzed ethylene-vinyl acetate copolymer (D)=87/6/5/2 ((A)/(D)=98/2). The results are shown in Table 1.

EXAMPLE 10

The experiment and evaluation were conducted in the same manner as in Example 1, except that the weight ratio was LDPE (A)/calcium stearate (B)/zeolite (C)/hydrolyzed ethylene-vinyl acetate copolymer (D)=25/6/5/64 ((A)/(D)= 28/72). The results are shown in Table 1.

COMPARATIVE EXAMPLE 1

The experiment and evaluation were conducted in the same manner as in Example 1, except that the modifying pellets were not compounded. The results are shown in Table 1.

TABLE 1

|  | Surface smoothness | Fish-eye | Pigment dispersibility | Foreign material from phase separation |
|---|---|---|---|---|
| Ex. 1 | ○ | ○ | ○ | ○ |
| Ex. 2 | ○ | Δ | Δ | ○ |
| Ex. 3 | ○ | ○ | ○ | ○ |
| Ex. 4 | ○ | ○ | ○ | ○ |
| Ex. 5 | ○ | ○ | ○ | ○ |
| Ex. 6 | Δ | Δ | Δ | Δ |
| Ex. 7 | Δ | Δ | Δ | Δ |
| Ex. 8 | Δ | Δ | Δ | ○ |
| Ex. 9 | Δ | Δ | Δ | Δ |
| Ex. 10 | Δ | Δ | Δ | Δ |
| Com. Ex. 1 | X | X | X | X |

EXAMPLES 11 TO 20

A multi-layer sheet was prepared in the same manner as in Examples 1 to 10 respectively, except that the white pigment master batch was not used. Then, the obtained multi-layer sheet was evaluated for surface smoothness and the number of fish-eyes in the same manner as in Examples 1 to 10. The results are shown in Table 2. Also, transparency, gas barrier properties and odor were evaluated in the following manner.

Using the obtained multi-layer sheet, thermal drawing mold processing was conducted under the conditions of heater temperature of 500° C. and sheet surface temperature of 130° C. in a plug-assist vacuum and pressure forming machine (made by Asano Laboratories Co., Ltd.) to prepare a cup (top face: 65 mm φ, bottom face: 60 mm φ, depth: 55 mm). The transparency, gas barrier properties and odor of the cup were evaluated. The sheet surface temperature was adjusted by the heating time of the heater.

(5) Transparency

The obtained cup was measured using a hazemeter and evaluated by the following criteria.
○: Haze of less than 10
Δ: Haze of 10 to 15
X: Haze of 15 or more (6) Gas Barrier Properties The top face of the obtained cup was sealed with an aluminum plate and the oxygen permeability was measured using OXTRAN 10/50 made by Modern Control Inc., under conditions of 23° C. and RH of 100% inside the cup and 23° C. and RH of 50% outside the cup.

(7) Evaluation of Odor

A piece (about 25 mg) of the obtained cup was placed in a sample tube and heated under helium gas current for 2 hours at 250° C. using a thermal desorption system (TDS). The generated gas was collected in a condenser (CIS: cooled injection system) of −150° C. and condensed for 2 hours. Thereafter, the condenser was rapidly heated to 250° C. The condensed component was vaporized and introduced into an analysis column and then analysis was conducted by GC/MS,
○: Acetaldehyde+crotonaldehyde+acetone is less than 150 ppm
Δ: Acetaldehyde+crotonaldehyde+acetone is 150 ppm or more and less than 500 ppm
X: Acetaldehyde+crotonaldehyde+acetone is 500 ppm or more

COMPARATIVE EXAMPLE 2

A multi-layer sheet was prepared in the same manner as in Comparative Example 1, except that the white pigment master batch was not used and evaluation was conducted in the same manner as in Examples 11 to 20. The results are shown in Table 2.

COMPARATIVE EXAMPLE 3

The experiment and evaluation were conducted in the same manner as in Example 11, except that hydrotalsite [available from Kyowa Chemical Industry Co., Ltd., DHT-4A] was used instead of zeolite (C). The results are shown in Table 2. When this experiment was conducted using the white pigment master batch, the results of evaluation for surface smoothness, number of fish-eye, pigment dispersibility and inhibition of foreign material produced by phase separation, conducted in the same manner as in Example 1, were all ○.

TABLE 2

|  | Multi-layer sheet | | Cup | | |
|---|---|---|---|---|---|
|  | Surface smoothness | Fish-eye | Transparency | Gas barrier properties (cc/cup. day. air) | Odor |
| Ex. 11 | ○ | ○ | ○ | 0.002 | ○ |
| Ex. 12 | Δ | ○ | ○ | 0.002 | ○ |
| Ex. 13 | ○ | ○ | ○ | 0.002 | ○ |
| Ex. 14 | ○ | ○ | ○ | 0.002 | ○ |
| Ex. 15 | ○ | ○ | ○ | 0.002 | ○ |
| Ex. 16 | Δ | Δ | Δ | 0.004 | Δ |
| Ex. 17 | Δ | Δ | ○ | 0.012 | Δ |
| Ex. 18 | Δ | Δ | Δ | 0.002 | Δ |
| Ex. 19 | ○ | Δ | Δ | 0.004 | Δ |
| Ex. 20 | Δ | ○ | Δ | 0.008 | ○ |
| Com. Ex. 2 | X | X | X | 0.005 | X |
| Com. Ex. 3 | ○ | ○ | ○ | 0.007 | X |

The multi-layer structure prepared by compounding the resin composition of the present invention to a multi-layer structure containing EVOH exhibits favorable processability and also, is inhibited in production of degraded materials derived from EVOH, cross-linking of EVOH and transfer of odorous decomposition gas generated by thermal decomposition of EVOH to outside the multi-layer structure. Consequently, by using the obtained multi-layer structure, a molded article that has excellent appearance can be prepared safely and inexpensively. In this way, the recycling method using the resin composition of the present invention contributes largely to improved productivity of multi-layer containers.

What is claimed is:

1. A resin composition for molding, comprising
(A) polyolefin,
(B) metal salt of higher fatty acid having 12 to 30 carbon atoms,
(C) zeolite, and
a chip or remolded pellet of a collected multi-layer structure containing a hydrolyzed ethylene-vinyl acetate copolymer.

2. The resin composition of claim 1, further comprising (D) hydrolyzed ethylene-vinyl acetate copolymer, wherein in the (D) hydrolyzed ethylene-vinyl acetate copolymer the ethylene content is 70 to 95% by mol and the hydrolysis degree of the vinyl acetate component is at least 85% by mol.

3. The resin composition of claim 1, wherein the content of (C) zeolite is at least 5% by weight and less than 50% by weight.

4. The resin composition of claim 2, wherein the weight ratio of (A) polyolefin and (D) hydrolyzed ethylene-vinyl acetate copolymer is 95 to 30:5 to 70.

* * * * *

UNITED STATES PATENT AND TRADEMARK OFFICE
CERTIFICATE OF CORRECTION

PATENT NO. : 7,332,025 B2  Page 1 of 1
APPLICATION NO. : 10/925787
DATED : February 19, 2008
INVENTOR(S) : Shida et al.

It is certified that error appears in the above-identified patent and that said Letters Patent is hereby corrected as shown below:

In column 8, line 7 "," should be --.--.

Signed and Sealed this

First Day of July, 2008

JON W. DUDAS
*Director of the United States Patent and Trademark Office*